United States Patent
Geng et al.

(10) Patent No.: US 11,140,654 B2
(45) Date of Patent: Oct. 5, 2021

(54) METHOD FOR SENDING PAGING MESSAGE AND RELATED DEVICE

(71) Applicant: HUAWEI TECHNOLOGIES CO., LTD., Guangdong (CN)

(72) Inventors: Tingting Geng, Shanghai (CN); Hongping Zhang, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/584,307

(22) Filed: Sep. 26, 2019

(65) Prior Publication Data

US 2020/0022104 A1   Jan. 16, 2020

Related U.S. Application Data

(63) Continuation of application No. PCT/CN2018/099149, filed on Aug. 7, 2018.

(30) Foreign Application Priority Data

Aug. 11, 2017 (CN) .......................... 201710686861.3

(51) Int. Cl.
*H04W 68/00* (2009.01)
*H04W 8/18* (2009.01)
*H04W 76/28* (2018.01)
*H04W 4/90* (2018.01)
*H04W 76/27* (2018.01)
(Continued)

(52) U.S. Cl.
CPC .......... *H04W 68/005* (2013.01); *H04W 8/18* (2013.01); *H04W 4/06* (2013.01); *H04W 4/90* (2018.02); *H04W 76/27* (2018.02); *H04W 76/28* (2018.02); *H04W 84/042* (2013.01)

(58) Field of Classification Search
None
See application file for complete search history.

(56) References Cited

U.S. PATENT DOCUMENTS

2011/0171929 A1* 7/2011 Tamura .................. H04W 48/12
455/404.1
2012/0276933 A1* 11/2012 Laitinen .............. H04W 68/025
455/458
(Continued)

FOREIGN PATENT DOCUMENTS

| CN | 101217778 A | 7/2008 |
| CN | 101272521 A | 9/2008 |

(Continued)

OTHER PUBLICATIONS

R3-172426-3GPP TSG RAN WG3 NR AD HOC Qingdao_China_27rd-29th_Jun 2017.pdf (Year: 2017).*
(Continued)

*Primary Examiner* — Jinsong Hu
*Assistant Examiner* — Alexander J Yi
(74) *Attorney, Agent, or Firm* — Fish & Richardson P.C.

(57) ABSTRACT

Example paging message sending method and apparatus are described to notify each UE of a paging cause. In one example method, a first network node sends a paging message to a second network node. The paging message carries indication information, which is used to indicate a paging cause.

6 Claims, 9 Drawing Sheets

(51) Int. Cl.
*H04W 4/06* (2009.01)
*H04W 84/04* (2009.01)

(56) References Cited

U.S. PATENT DOCUMENTS

| | | | |
|---|---|---|---|
| 2016/0073285 A1 | 3/2016 | Graham et al. | |
| 2017/0367050 A1 | 12/2017 | Nagasaka et al. | |
| 2018/0213579 A1* | 7/2018 | Hong | H04W 76/11 |
| 2018/0234894 A1 | 8/2018 | Jiang | |
| 2018/0368109 A1* | 12/2018 | Kim | H04W 72/0433 |
| 2019/0059039 A1* | 2/2019 | Centonza | H04W 76/15 |
| 2019/0199412 A1* | 6/2019 | Koskela | H04B 7/088 |
| 2019/0223251 A1 | 7/2019 | Jiang et al. | |
| 2020/0137717 A1* | 4/2020 | Liu | H04W 28/0289 |

FOREIGN PATENT DOCUMENTS

| | | |
|---|---|---|
| CN | 101541076 A | 9/2009 |
| CN | 101784097 A | 7/2010 |
| CN | 104641703 A | 5/2015 |
| CN | 106538037 A | 3/2017 |
| CN | 106550452 A | 3/2017 |
| CN | 106658758 A | 5/2017 |
| KR | 20160135090 A | 11/2016 |
| WO | 2009112543 A1 | 9/2009 |
| WO | 2016140272 A1 | 9/2016 |
| WO | 2017010693 A1 | 1/2017 |
| WO | 2017028024 A1 | 2/2017 |

OTHER PUBLICATIONS

Ericsson, "Paging in disaggregated gNB," 3GPP TSG-RAN WG3 AH #2, Tdoc R3-172518; Qingdao, P. R. China, Jun. 27-29, 2017, 2 pages.
Huawei, "Paging delivery over F1," 3GPP TSG RAN WG3 meeting #97, R3-173102; Berlin, Germany, Aug. 21-25, 2017, 3 pages.
Nokia et al., "Further discussion on Paging relaying," 3GPP TSG-RAN WG2 Meeting *98, R2-1704327; Hangzhou, China, XP051274902, May 15-19, 2017, 4 pages.
Office Action issued in Chinese Application No. 201710686861.3 dated Feb. 6, 2020, 27 pages (with English translation).
Partial Supplementary European Search Report issued in European Application No. 18843641.4 dated Feb. 27, 2020, 18 pages.
PCT International Search Report and Written Opinion issued in International Application No. PCT/CN2018/099149 dated Oct. 17, 2018, 19 pages (with English translation).
Qualcomm Incorporated, "Support of paging in F1," 3GPP TSG-RAN WG3 Meeting #97bis, R3-173908; Prague, Czech Republic, XP051344320, Oct. 9-13, 2017, 3 pages.
RAN3, "LS on RAN2 dependent issues for RAN3 study on New Radio," SA WG2 Meeting #S2-118, S2-167114; Reno, Nevada, USA, Nov. 14-18, 2016, 2 pages.
Office Action issued in Chinese Application No. 201710686861.3 dated Sep. 30, 2020, 26 pages (with English translation).

* cited by examiner

METHOD FOR SENDING PAGING MESSAGE AND RELATED DEVICE

CROSS-REFERENCE TO RELATED APPLICATIONS

This application is a continuation of International Application No. PCT/CN2018/099149, filed on Aug. 7, 2018, which claims priority to Chinese Patent Application No. 201710686861.3, filed on Aug. 11, 2017. The disclosures of the aforementioned applications are hereby incorporated by reference in their entireties.

TECHNICAL FIELD

This application relates to the field of communications technologies, and in particular, to a method for sending a paging message and a related device.

BACKGROUND

A system message refers to some basic features of a current cell or network and some common features of user equipment (UE), and is unrelated to specific UE. UE may obtain a basic feature of a current network and cell by receiving a system message of a network system. The network system may provide a coverage area of the cell and specific channel information by using a specific broadcast identity (ID).

In current network systems, when a system message of a cell changes, the network systems need to indicate different system message change types to UEs by using paging messages, so that each UE can learn that the system message changes.

However, a central unit-distributed unit (CU-DU) architecture is introduced in a fifth generation mobile communications technology (5G) network system. In the CU-DU architecture, an existing paging mechanism needs to be enhanced to adapt to the new architecture.

SUMMARY

Embodiments of this application provide a method for sending a paging message and a related device, so as to notify each UE of a paging cause.

In view of this, a first aspect of this application provides a method for sending a paging message, where the method may include: A first network node and a second network node are nodes in a network system, one first network node may be connected to one second network node, or one first network node may be connected to at least two second network nodes, that is, at least two second network nodes share one first network node. When the network system needs to notify each UE of a paging cause, the first network node may generate a paging message, and then send the generated paging message to the second network node, where the paging message carries indication information, and the indication information is used to indicate the paging cause. It may be learned that, because the paging message sent by the first network node to the second network node carries the indication information used to indicate the paging cause, the second network node can clearly determine a cause for sending the paging message by the first network node, and the second network node can notify each UE of the paging cause.

In some possible implementations, a related description is provided for the paging cause, for example, the paging cause includes a system message change cause.

In some possible implementations, a related description is provided for the system message change cause. For example, the system message change cause may include at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A second aspect of this application provides a method for sending a paging message, where the method may include: A first network node and a second network node are nodes in a network system, one first network node may be connected to one second network node, or one first network node may be connected to at least two second network nodes, that is, at least two second network nodes share one first network node. When the network system needs to page to-be-paged target UE, the first network node may generate a paging message, and then send the generated paging message to the second network node, where the paging message carries identification information of the to-be-paged target UE. The first network node may continuously update the identification information of the target UE in the paging message. If the first network node updates the identification information of the target UE in the paging message, the first network node sends an updated paging message to the second network node, where the updated paging message carries updated identification information of the to-be-paged target UE. It may be learned that because the first network node may continuously update the identification information of the target UE in the paging message, an implementation of sending the updated paging message to the second network node is provided.

In some possible implementations, if the first network node receives a paging response of first UE in the target UE, the first network node may determine that identification information of the first UE is invalid, that is, it is unnecessary to page the first UE anymore. Therefore, the first network node deletes the identification information of the first UE in the paging message. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid, that is, it is unnecessary to page the target UEs on the paging occasion anymore. Therefore, the first network node may instruct the second network node to stop notifying each UE of the identification information of the to-be-paged target UE on the paging occasion, that is, the first network node may instruct the second network node to stop paging the target UE on the paging occasion. Similarly, if the first network node needs to additionally page second UE, that is, the first network node determines to add identification information of the second UE to the identification information of the target UE, the first network node adds the identification information of the second UE to the identification information of the second UE.

In some possible implementations, the first network node may send sending times information of each paging message to the second network node, and the sending times may be preconfigured. In addition, to ensure successful sending of the paging message, the first network node may increase a priority of the paging message, and then the first network node may indicate priority information of the paging message to the second network node.

In some possible implementations, the paging message further carries paging configuration information, and the paging configuration information is used by the second network node to determine a sending occasion of the paging message.

In some possible implementations, the paging configuration information may include at least one of the following information: a paging cycle, an identifier of the to-be-paged target UE, and a paging occasion (PO). The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A third aspect of this application provides a method for sending a paging message, where the method may include: A first network node and a second network node are nodes in a network system, one first network node may be connected to one second network node, or one first network node may be connected to at least two second network nodes, that is, at least two second network nodes share one first network node. When the network system needs to page to-be-paged target UE, the first network node may generate first indication information, and then send the generated first indication information to the second network node, where the first indication information carries identification information of the to-be-paged target UE. Because the first network node may want to update the identification information of the target UE, the first network node may send second indication information to the second network node, where the second indication information is used to instruct the second network node to update the identification information of the to-be-paged target UE. It may be learned that because the first network node may want to continuously update the identification information of the target UE, an implementation of instructing the second network node to generate and update the paging message is provided.

In some possible implementations, if the first network node receives a paging response of first UE in the target UE, the first network node may determine that identification information of the first UE is invalid, that is, it is unnecessary to page the first UE anymore. Therefore, the first network node sends, to the second network node, indication information used to instruct to delete the identification information of the first UE. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion. Similarly, if the first network node needs to additionally page second UE, that is, the first network node determines to add identification information of the second UE to the identification information of the target UE, the first network node sends, to the second network node, second indication information used to instruct to add the identification information of the second UE to the paging message.

In some possible implementations, the first indication information further carries paging configuration information, or the second indication information carries paging configuration information, and the paging configuration information is used by the second network node to determine a sending occasion of the paging message.

In some possible implementations, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A fourth aspect of this application provides a method for sending a paging message, where the method may include: A first network node and a second network node are nodes in a network system, one first network node may be connected to one second network node, or one first network node may be connected to at least two second network nodes, that is, at least two second network nodes share one first network node. When the network system needs to notify each UE of a paging cause, the first network node may generate a paging message, and then send the generated paging message to the second network node, where the paging message carries indication information, and the indication information is used to indicate the paging cause. After receiving the paging message sent by the first network node, the second network node reads the indication information in the paging message, and further notifies each UE in the network system of the paging cause according to the indication information. It may be learned that, because the paging message sent by the first network node to the second network node carries the indication information used to indicate the paging cause, the second network node can clearly determine a cause for sending the paging message by the first network node, and the second network node can notify each UE of the paging cause.

In some possible implementations, after receiving the paging message sent by the first network node, the second network node reads the indication information in the paging message, and then correspondingly generates downlink control information (DCI) according to the indication information. The DCI carries the indication information used to notify the paging cause. For example, the DCI carries preset indication information, or the indication information carried in the DCI is a preset value.

In some possible implementations, a related description is provided for the paging cause, for example, the paging cause includes a system message change cause.

In some possible implementations, a related description is provided for the system message change cause. For example, the system message change cause may include at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A fifth aspect of this application provides a method for sending a paging message, where the method may include: A first network node and a second network node are nodes in a network system, one first network node may be connected to one second network node, or one first network node may be connected to at least two second network nodes, that is, at least two second network nodes share one first network node. When the network system needs to page to-be-paged target UE, the first network node may generate first indication information, and then send the generated first indication information to the second network node, where the first indication information carries identification information of the to-be-paged target UE. After receiving the first indication information sent by the first network node, the second network node reads the identification information of the to-be-paged target UE in the first indication information, determines a sending occasion based on the identification information of the to-be-paged target UE, generates a paging message on the sending occasion, and notifies each UE in the network system of the to-be-paged target UE based on the determined sending occasion by using the paging message. Because the first network node may want to update the identification information of the target UE in the paging message, the first network node may send second indication information to the second network node, where the second indication information is used to instruct the second network node to update the identification information of the to-be-paged target UE. After receiving the second indication information sent by the first network node, the second network node updates the identification information of the to-be-paged target UE according to the second indication information, to obtain updated identification information of the to-be-paged target UE. After updating the identification information of the to-be-paged target UE according to the second indication information, the second network node determines a sending occasion, generates a paging message on the sending occasion, and notifies each UE in the network system of the updated identification information of the to-be-paged target UE based on the determined sending occasion by using the paging message. It may be learned that because the first network node may want to continuously update the identification information of the target UE, an implementation of generating and updating the paging message by the second network node is provided.

In some possible implementations, if the first network node receives a paging response of first UE in the target UE, the first network node may determine that identification information of the first UE is invalid, that is, it is unnecessary to page the first UE anymore. Therefore, the first network node sends, to the second network node, second indication information used to instruct to delete the identification information of the first UE in the paging message. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion. Similarly, if the first network node needs to additionally page second UE, that is, the first network node determines to add identification information of the second UE to the identification information of the target UE, the first network node sends, to the second network node, second indication information used to instruct to add the identification information of the second UE to the paging message.

In some possible implementations, the first indication information further carries paging configuration information, or the second indication information carries paging configuration information, and the second network node determines a sending occasion of the paging message based on the paging configuration information.

In some possible implementations, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A sixth aspect of this application provides a network node. The network node is the foregoing first network node. The network node may implement a function of the method provided in any one of the optional implementations of the first aspect. The function may be implemented by software. The software includes the following module corresponding to the function: a sending module, configured to send a paging message to a second network node, where the paging message carries indication information, and the indication information is used to indicate a paging cause. It may be learned that, because the paging message sent by the first network node to the second network node carries the indication information used to indicate the paging cause, the second network node can clearly determine a cause for sending the paging message by the first network node, and the second network node can notify each UE of the paging cause.

In some possible implementations, a related description is provided for the paging cause, for example, the paging cause includes a system message change cause.

In some possible implementations, a related description is provided for the system message change cause. For example, the system message change cause may include at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A seventh aspect of this application provides a network node, where the network node is the foregoing first network node, the network node may implement functions of the method provided in any one of the optional implementations of the second aspect, and the functions may be implemented by software. The software includes the following modules corresponding to the functions: a first sending module, configured to send a paging message to a second network node, where the paging message carries identification information of to-be-paged target user equipment UE; and a second sending module, configured to send an updated paging message to the second network node, where the updated paging message carries updated identification information of the to-be-paged target UE. It may be learned that because the first network node may continuously update the identification information of the target UE in the paging message, an implementation of sending the updated paging message to the second network node is provided.

In some possible implementations, the network node further includes: a receiving module, configured to receive a paging response of first UE in the target UE; a determining module, configured to determine, based on the paging response, that identification information of the first UE is invalid; a deletion module, configured to delete the identification information of the first UE in the paging message; and/or a processing module, configured to add identification information of second UE to the paging message. It may be learned that, if the first network node receives the paging response of the first UE in the target UE, the first network node may determine that the identification information of the first UE is invalid, that is, it is unnecessary to page the first UE anymore. Therefore, the first network node deletes the identification information of the first UE in the paging message. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid, that is, it is unnecessary to page the target UEs on the paging occasion anymore. Therefore, the first network node may instruct the second network node to stop notifying each UE of the identification information of the to-be-paged target UE on the paging occasion, that is, the first network node may instruct the second network node to stop paging the target UE on the paging occasion. Similarly, if the first network node needs to additionally page the second UE, that is, the first network node determines to add the identification information of the second UE to the identification information of the target UE, the first network node adds the identification information of the second UE to the identification information of the second UE.

In some possible implementations, the network node further includes: a third sending module, configured to send sending times information of the paging message and/or priority information of the paging message to the second network node. It may be learned that, the first network node may send sending times information of each paging message to the second network node, and the sending times may be preconfigured. In addition, to ensure successful sending of the paging message, the first network node may increase a priority of the paging message, and then the first network node may indicate the priority information of the paging message to the second network node.

In some possible implementations, the paging message further carries paging configuration information, and the paging configuration information is used by the second network node to determine a sending occasion of the paging message.

In some possible implementations, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

An eighth aspect of this application provides a network node, where the network node is the foregoing first network node, the network node may implement functions of the method provided in any one of the optional implementations of the third aspect, and the functions may be implemented by software. The software includes the following modules corresponding to the functions: a first sending module, configured to send first indication information to a second network node, where the first indication information carries identification information of to-be-paged target user equipment UE; and a second sending module, configured to send second indication information to the second network node, where the second indication information is used to instruct the second network node to update the identification information of the to-be-paged target UE. It may be learned that because the first network node may want to continuously update the identification information of the target UE in the paging message, an implementation of instructing the second network node to update the paging message is provided.

In some possible implementations, the second sending module is specifically configured to: if a paging response of first UE in the target UE is received, and it is determined, based on the paging response, that identification information of the first UE is invalid, send, to the second network node, second indication information used to instruct to delete the identification information of the first UE; and/or send, to the second network node, second indication information used to instruct to add identification information of second UE. It may be learned that, if the first network node receives the paging response of the first UE in the target UE, the first network node may determine that the identification information of the first UE is invalid, that is, it is unnecessary to page the first UE anymore. Therefore, the first network node sends, to the second network node, the indication information used to instruct to delete the identification information of the first UE. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion.

Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

In some possible implementations, the first indication information further carries paging configuration information, or the second indication information carries paging configuration information, and the paging configuration information is used by the second network node to determine a sending occasion of the paging message.

In some possible implementations, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A ninth aspect of this application provides a network node. The network node is the foregoing second network node. The network node may implement functions of the method provided in any one of the optional implementations of the fourth aspect. The functions may be implemented by software. The software includes the following modules corresponding to the functions: a receiving module, configured to receive a paging message sent by a first network node, where the paging message carries indication information, and the indication information is used to indicate a paging cause; and a notification module, configured to notify each user equipment UE of the paging cause according to the indication information. It may be learned that, because the paging message sent by the first network node to the second network node carries the indication information used to indicate the paging cause, the second network node can clearly determine a cause for sending the paging message by the first network node, and the second network node can notify each UE of the paging cause.

In some possible implementations, the notification module is specifically configured to send DCI to each UE according to the indication information, where the DCI carries preset indication information, and the preset indication information is used to notify each UE of the paging cause.

In some possible implementations, a related description is provided for the paging cause, for example, the paging cause includes a system message change cause.

In some possible implementations, a related description is provided for the system message change cause. For example, the system message change cause may include at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

A tenth aspect of this application provides a network node, where the network node is the foregoing second network node, the network node may implement functions of the method provided in any one of the optional implementations of the fifth aspect, and the functions may be implemented by software. The software includes the following modules corresponding to the functions: a first receiving module, configured to receive first indication information sent by a first network node, where the first indication information carries identification information of to-be-paged target user equipment UE; a second receiving module, configured to receive second indication information sent by the first network node, where the second indication information is used to instruct the second network node to update the identification information of the to-be-paged target UE; an update module, configured to update the identification information of the to-be-paged target UE according to the second indication information, to obtain updated identification information of the to-be-paged target UE; and a notification module, configured to notify each UE of the updated identification information of the to-be-paged target UE according to the updated identification information of the to-be-paged target UE. It may be learned that because the first network node may want to continuously update the identification information of the target UE, an implementation of generating and updating the paging message by the second network node is provided.

In some possible implementations, the second receiving module is specifically configured to receive second indication information that is sent by the first network node and that is used to instruct to delete identification information of first UE; and/or receive second indication information that is sent by the first network node and that is used to instruct to add identification information of second UE. It may be learned that, if the first network node receives a paging response of the first UE in the target UE, the first network node may determine that the identification information of the first UE is invalid, that is, it is unnecessary to page the first UE anymore. Therefore, the first network node sends, to the second network node, the second indication information used to instruct to delete the identification information of the first UE in the paging message. It may be understood that, after the identification information of the first UE in the paging message is deleted, the identification information of the to-be-paged target UE is updated. It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion. Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

In some possible implementations, the first indication information further carries paging configuration information, or the second indication information carries paging configuration information, and the second network node determines a sending occasion of the paging message based on the paging configuration information.

In some possible implementations, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message.

In some possible implementations, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible implementations, the packet data convergence protocol layer function includes at least one of a packet data convergence protocol layer control plane function and a packet data convergence protocol layer user plane function.

An eleventh aspect of this application provides a network node, where the network node is the foregoing first network node, and the network node includes a memory, a transceiver, and at least one processor. The memory stores an instruction, and the memory, the transceiver, and the at least one processor are interconnected by using a line; the transceiver is configured to perform message receiving and sending operations performed on the network node side in any one of the optional implementations of the first aspect to the third aspect; and the at least one processor invokes the instruction to perform a message processing or control operation performed on the network node side in any one of the optional implementations of the first aspect to the third aspect.

A twelfth aspect of this application provides a network node, where the network node is the foregoing second network node, and the network node includes a memory, a transceiver, and at least one processor. The memory stores an instruction, and the memory, the transceiver, and the at least one processor are interconnected by using a line; the transceiver is configured to perform message receiving and sending operations performed on the network node side in any one of the optional implementations of the fourth aspect or the fifth aspect; and the at least one processor invokes the instruction to perform a message processing or control operation performed on the network node side in any one of the optional implementations of the fourth aspect or the fifth aspect.

A thirteenth aspect of this application provides a computer storage medium, applied to a network node. The computer readable storage medium stores an instruction, and when the instruction runs on a computer, the computer is enabled to perform the method according to any one of the optional implementations of the first aspect to the third aspect, or the computer is enabled to perform the method according to any one of the optional implementations of the fourth aspect or the fifth aspect.

A fourteenth aspect of this application provides a system, including a first network node, a second network node, and user equipment. The first network node is configured to perform the method according to any one of the optional implementations of the first aspect to the third aspect, and the second network node is configured to perform the method according to any one of the optional implementations of the fourth aspect or the fifth aspect.

It may be learned from the foregoing technical solutions that the embodiments of this application have the following advantages: Because the paging message sent by the first network node to the second network node carries the indication information used to indicate the paging cause, the second network node can notify each UE of the paging cause according to the indication information. Therefore, the paging cause can be notified to each UE in this application.

DESCRIPTION OF DRAWINGS

To describe the technical solutions in this application more clearly, the following briefly describes the accompanying drawings required for describing the embodiments. Apparently, the accompanying drawings in the following description show merely some embodiments of this application, and an ordinary person skilled in the art may still derive other drawings from these accompanying drawings.

DESCRIPTION OF EMBODIMENTS

Embodiments of this application provide a method for sending a paging message and a related device, so as to notify each UE of a paging cause.

The following clearly and completely describes the technical solutions in this application with reference to the accompanying drawings in this application. Apparently, the described embodiments are merely some but not all of this application.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances, so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

As mentioned in the background, in a CU-DU architecture, a paging message needs to be enhanced to adapt to the CU-DU architecture.

Figure 1:
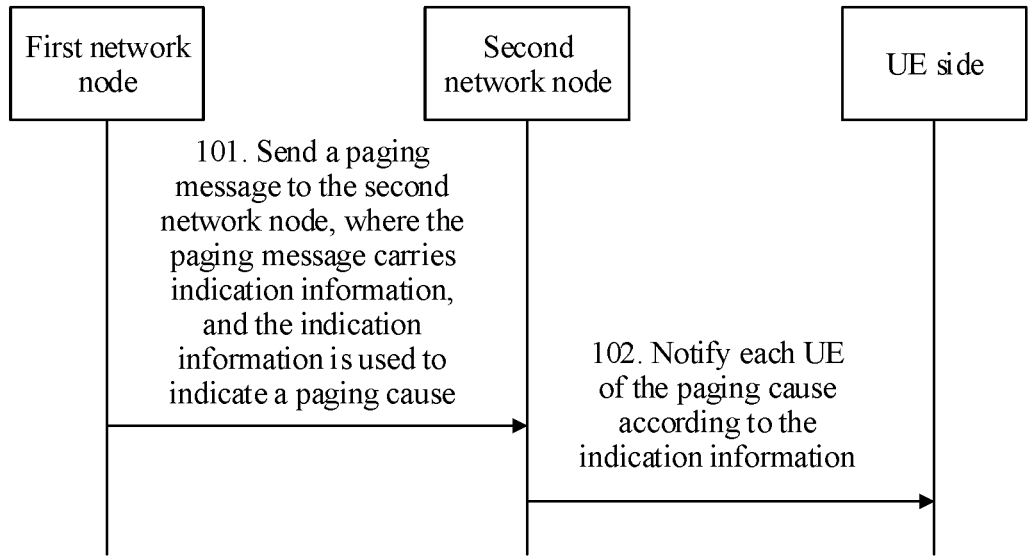
FIG. 1 is a flowchart of a method for sending a paging message according to this application.

To enable the paging message to adapt to the CU-DU architecture, the following describes the method for sending a paging message in this application by using a specific embodiment. Referring to FIG. 1, an embodiment of the method for sending a paging message in this application includes the following steps.

101. A first network node sends a paging message to a second network node, where the paging message carries indication information, and the indication information is used to indicate a paging cause.

In this embodiment, the first network node and the second network node are nodes in a network system. One first network node may be connected to one second network node, or one first network node may be connected to at least two second network nodes, that is, at least two second network nodes share one first network node.

When the network system needs to notify each UE of a paging cause, the first network node may generate a paging message, and then send the generated paging message to the second network node, where the paging message carries indication information, and the indication information is used to indicate the paging cause.

It should be noted that a size of the indication information may be 1 bit, or may be more bits. This is not limited herein.

102. The second network node notifies each UE of the paging cause according to the indication information.

In this embodiment, after receiving the paging message sent by the first network node, the second network node reads the indication information in the paging message, and further notifies each UE in the network system of the paging cause according to the indication information.

In some possible embodiments of this application, that the second network node notifies each UE of the paging cause according to the indication information may be as follows:

The second network node sends downlink control information DCI to each UE according to the indication information, where the DCI carries preset indication information, and the preset indication information is used to notify each UE of the paging cause.

In this embodiment, after receiving the paging message sent by the first network node, the second network node reads the indication information in the paging message, and then correspondingly sends the DCI according to the indication information. The DCI carries the indication information used to notify the paging cause. For example, the DCI carries the preset indication information, or the indication information carried in the DCI is a preset value.

In some possible embodiments of this application, the paging cause may include a system message change cause. Further, the system message change cause may include at least one of the following information: a system message modification, a system message modification during long discontinuous reception, a system message change of an earthquake and tsunami warning system, a system message change of a commercial mobile alert system, and a system message change of a multicast broadcast intra-frequency network.

Correspondingly, the indication information carried in the DCI sent by the second network node may be at least one of the system message modification, the system message modification during long discontinuous reception, the system message change of the earthquake and tsunami warning system, the system message change of the commercial mobile alert system, and the system message change of the multicast broadcast intra-frequency network.

In other possible embodiments of this application, the indication information carried in the paging message sent by the first network node may further indicate which system messages or system message blocks change. Correspondingly, the indication information carried in the DCI sent by the second network node may also indicate which system messages or system message blocks change.

In still other possible embodiments of this application, the indication information carried in the paging message sent by the first network node may further indicate a paging message that exists for paging user equipment. Correspondingly, the indication information carried in the DCI sent by the second network node may also indicate the paging message that exists for paging user equipment. After receiving the indication information, the user equipment initiates access to a network and indicates identification information of the user equipment to the network, where an identifier of the user equipment includes an access stratum identifier or a non-access stratum identifier, so that the network determines, based on the identification information of the user equipment, whether the user equipment is to-be-paged user equipment.

The DCI may be transmitted on a downlink control channel, and the downlink control channel includes at least one of the following channels: a physical downlink control channel (PDCCH), an enhanced physical downlink control channel (EPDCCH), a narrow band physical downlink control channel (NPDCCH), and a multimedia broadcast single frequency network (MBSFN) PDCCH.

In some possible embodiments of this application, functions of the first network node and the second network node are described. Specifically, the first network node has at least one of a radio resource control (RRC) layer function, a service data adaptation (SDAP) layer function, and a packet data convergence protocol (PDCP) layer function; and/or the second network node has at least one of a radio link control (RLC) layer function, a media access control (MAC) layer function, and a physical layer function.

Further, the packet data convergence protocol layer function includes at least one of a packet data convergence protocol layer control plane (PDCP-C) function and a packet data convergence protocol layer user plane (PDCP-U) function.

To facilitate understanding of the related descriptions of the functions of the first network node and the second network node, the following uses an example in which the first network node is a central unit (CU) and the second network node is a distributed unit (DU) for description.

A base station may include a CU and a DU. To be specific, functions of the base station in an access network are split, some functions of the base station are deployed on the CU, and remaining functions of the base station are deployed on the DU. One CU may be connected to one DU, or at least two DUs share one CU, so as to reduce costs and facilitate network expansion. The CU and the DU may be split based on a protocol stack. In a possible manner, a radio resource control layer, a service data adaptation layer, and a packet data convergence protocol layer are deployed on the CU, and a radio link control layer, a media access control layer, and a physical layer are deployed on the DU. The protocol stack splitting manner is not limited in this application. The protocol stack splitting manner is merely an example. There may be another splitting manner in this application, which is not limited herein.

The CU is connected to the DU through an F1 interface, and on behalf of the base station, the CU is connected to a core network through an Ng interface.

Still further, the CU may be further divided into a control plane (CU-CP) and a user plane (CU-UP). The CU-CP is responsible for control plane functions, and mainly includes RRC and PDCP-C. The PDCP-C is mainly responsible for encryption and decryption of control plane data, integrity protection, data transmission, and the like. The CU-UP is responsible for user plane functions, and mainly includes SDAP and PDCP-U. The SDAP is mainly responsible for processing data of the core network and mapping a flow to a bearer. The PDCP-U is mainly responsible for encryption and decryption of user plane data, integrity protection, header compression, sequence number maintenance, data transmission, and the like. The CU-CP is connected to the CU-UP through an E1 interface. On behalf of the base station, the CU-CP is connected to the core network through the Ng interface. The CU-CP is connected to the DU through an F1-C interface. The CU-UP is connected to the DU through an F1-U interface. It should be noted that, in actual application, the PDCP-C may alternatively be in the CU-UP. It may be understood that names of the interface are merely used as an example. In this embodiment of this application, a specific interface name is not limited.

In this embodiment, because the paging message sent by the first network node to the second network node carries the indication information used to indicate the paging cause, the second network node can clearly determine a cause for sending the paging message by the first network node, and the second network node can notify each UE of the paging cause.

In addition, the second network node may notify each UE of the paging cause by using DCI, thereby reducing unnecessary paging signaling overheads.

Figure 2:
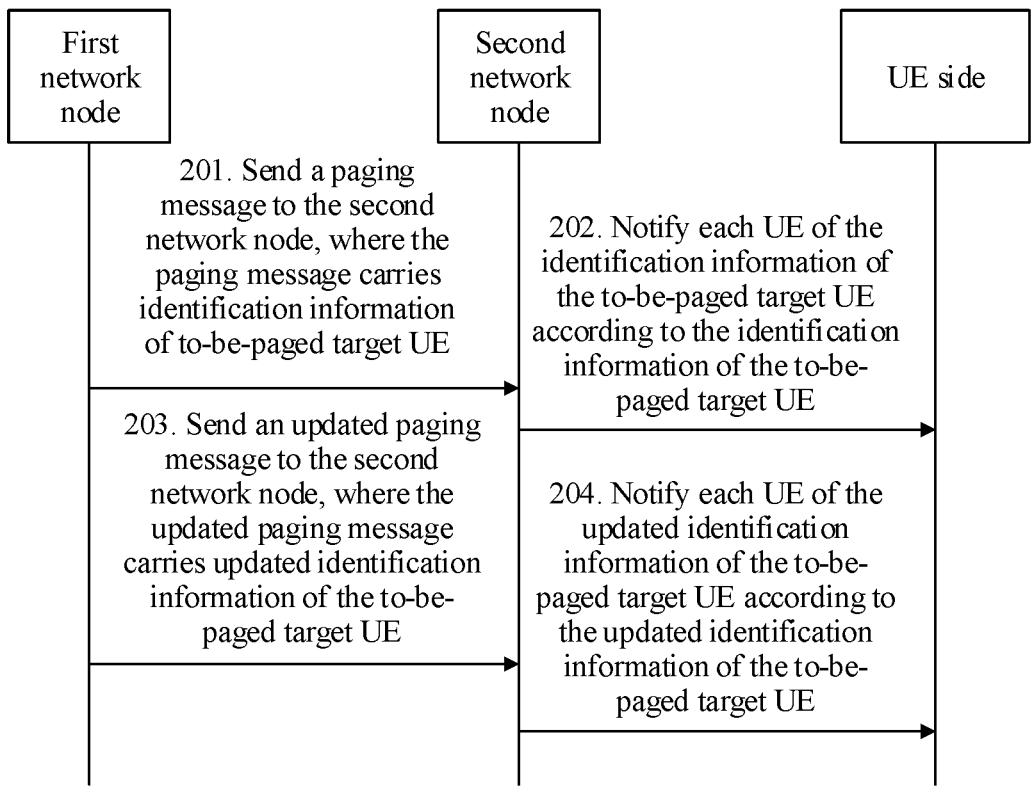
FIG. 2 is a flowchart of another method for sending a paging message according to this application.

In the foregoing embodiment, the paging message carries the indication information. The following uses an example in which the paging message carries identification information of UE. The identification information includes an access stratum identifier or a non-access stratum identifier. The method for sending a paging message in this application is described. Referring to FIG. 2, another embodiment of the method for sending a paging message in this application includes the following steps.

201. A first network node sends a paging message to a second network node, where the paging message carries identification information of to-be-paged target UE.

In this embodiment, the first network node and the second network node are nodes in a network system. One first network node may be connected to one second network node, or one first network node may be connected to at least two second network nodes, that is, at least two second network nodes share one first network node.

When the network system needs to page the to-be-paged target UE, the first network node may generate the paging message, and then send the generated paging message to the second network node, where the paging message carries the identification information of the to-be-paged target UE, and the identification information includes an access stratum identifier or a non-access stratum identifier.

202. The second network node notifies each UE of the identification information of the to-be-paged target UE.

In this embodiment, after receiving the paging message sent by the first network node, the second network node sends the paging message to each UE in the network system, so as to notify each UE in the network system of the identification information of the to-be-paged target UE.

The second network node notifies all the UEs in the network system that the to-be-paged target UE needs to be paged, and each of all the UEs in the network system receives a notification that carries the identification information of the to-be-paged target UE, so as to determine whether the UE is to be paged.

203. The first network node sends an updated paging message to the second network node, where the updated paging message carries updated identification information of the to-be-paged target UE.

In this embodiment, the first network node may continuously update the identification information of the target UE in the paging message. If the first network node updates the identification information of the target UE in the paging message, the first network node sends the updated paging message to the second network node, where the updated paging message carries the updated identification information of the to-be-paged target UE.

204. The second network node notifies each UE of the updated identification information of the to-be-paged target UE.

In this embodiment, after receiving the updated paging message sent by the first network node, the second network node sends the updated paging message to each UE in the network system, so as to notify each UE in the network system of the updated identification information of the to-be-paged target UE.

The second network node notifies all the UEs in the network system that the target UE corresponding to the updated identification information of the target UE needs to be paged, and each of all the UEs in the network system receives a notification that carries the updated identification information of the to-be-paged target UE, so as to determine whether the UE is to be paged.

In some possible embodiments of this application, before the first network node sends the updated paging message to the second network node, the method may include the following:

If the first network node receives a paging response of first UE in the target UE, and determines, based on the paging response, that identification information of the first UE is invalid, the first network node deletes the identification information of the first UE in the paging message; and/or the first network node adds identification information of second UE to the paging message.

In this embodiment, if the first network node receives the paging response of the first UE in the target UE, the first network node may determine that the identification information of the first UE is invalid, that is, it is unnecessary to page the first UE anymore. Therefore, the first network node deletes the identification information of the first UE in the paging message. It may be understood that, after the identification information of the first UE in the paging message is deleted, the identification information of the to-be-paged target UE is updated.

It should be noted that if the first network node receives paging responses of all target UEs on a paging occasion, the first network node may determine that identification information of all the target UEs on the paging occasion is invalid, that is, it is unnecessary to page the target UEs on the paging occasion anymore. Therefore, the first network node may instruct the second network node to stop notifying each UE of the identification information of the to-be-paged target UE on the paging occasion, that is, the first network node may instruct the second network node to stop paging the target UE on the paging occasion.

Similarly, if the first network node needs to additionally page the second UE, that is, the first network node determines to add the identification information of the second UE to the identification information of the target UE, the first network node adds the identification information of the second UE to the identification information of the second UE.

In this embodiment, the paging response may mean that a paging message received by UE carries identification information of the UE, and the UE initiates uplink access to notify the network that the UE has received the paging message. Specifically, the uplink access may mean sending a radio resource control connection request, a radio resource control resume request, or a radio resource control reactivation request, or may refer to another uplink message that carries an identifier of the UE in the paging message.

In some possible embodiments of this application, on the side of the first network node, the method may further include the following:

The first network node sends sending times information of the paging message and/or priority information of the paging message to the second network node.

Correspondingly, on the side of the second network node, the method may further include the following:

The second network node receives the sending times of the paging message and/or the priority information of the paging message that are/is sent by the first network node. Sending times of paging messages on sending occasions may be the same or may be different. This is not limited herein.

In this embodiment, the first network node may send the sending times information of the paging message to the second network node, and the sending times may be preconfigured. In addition, to ensure successful sending of the paging message, the first network node may increase a priority of the paging message, and then the first network node may indicate the priority information of the paging message to the second network node.

In some possible embodiments of this application, the paging message further carries paging configuration information. Therefore, the method may further include the following:

The second network node determines a sending occasion of the paging message based on the paging configuration information.

In this embodiment, after the second network node determines the sending occasion of the paging message based on the paging configuration information, for example, a sending occasion of the paging message corresponding to step 202 is a first sending occasion, and a sending occasion of the paging message corresponding to step 204 is a second sending occasion. Correspondingly, on the first sending occasion, the second network node notifies each UE of the identification information of the to-be-paged target UE according to the identification information of the paged target UE. On the second sending occasion, the second network node notifies each UE of the updated identification information of the to-be-paged target UE according to the updated identification information of the to-be-paged target UE.

Further, the paging configuration information may include at least one of the following information: a paging cycle, an identifier of the to-be-paged target UE, and a paging occasion. The identifier of the to-be-paged target UE includes an access stratum identifier, a non-access stratum identifier, an identifier determined based on the access stratum identifier, or an identifier determined based on the non-access stratum identifier. It should be noted that the paging occasion is the sending occasion of the paging message. That the paging configuration information includes the identifier of the to-be-paged target UE is merely an example, or the paging configuration information may include any identifier of UE that can be used to calculate a same paging occasion. For example, paging occasions determined by using an identifier 1 of UE 1 and an identifier 2 of UE 2 are the same. In this case, the UE 1 needs to be paged. The identifier of the UE in the paging configuration information may be the identifier 1 of the to-be-paged target UE 1, or may be the identifier 2 of the to-be-paged target UE 2, provided that the paging occasion determined by using the identifier of the UE in the paging configuration information is the same as the paging occasion of the to-be-paged target UE.

In some possible embodiments of this application, functions of the first network node and the second network node are described. Specifically, the first network node has at least one of a radio resource control layer function, a service data adaptation layer function, and a packet data convergence protocol layer function; and/or the second network node has at least one of a radio link control layer function, a media access control layer function, and a physical layer function.

Further, the packet data convergence protocol layer function includes at least one of a packet data convergence protocol layer control plane function and a packet data convergence protocol layer user plane function.

For related descriptions of the functions of the first network node and the second network node, refer to the foregoing embodiment. Details are not described herein again.

It may be understood that in this embodiment, the second network node is not to identify the identification information of the to-be-paged target UE that is carried in the paging message.

In this embodiment, because the first network node may continuously update the identification information of the target UE in the paging message, a method for generating and sending the updated paging message to the second network node by the first network node is provided.

In addition, when identification information of any UE in the identification information of the target UE in the paging message is no longer valid, the first network node may delete the identification information of the UE that is no longer valid.

Furthermore, when the first network node needs to additionally page UE, the first network node may add, to the paging message, identification information of the UE that needs to be paged additionally.

Finally, the first network node may send the sending times information of the paging message and/or the priority information of the paging message to the second network node, and send the sending times information of the paging message to the second network node to find the to-be-paged target UE as far as possible through paging for a plurality of times. In addition, the following case is avoided by setting the sending times: The first network node receives responses of all to-be-paged target UEs on a paging occasion, and then sends a paging message used to cancel the paging occasion to the second network node. Therefore, signaling is reduced. In addition, the priority information of the paging message is sent to the second network node, so as to ensure successful sending of the paging message.

Figure 3:
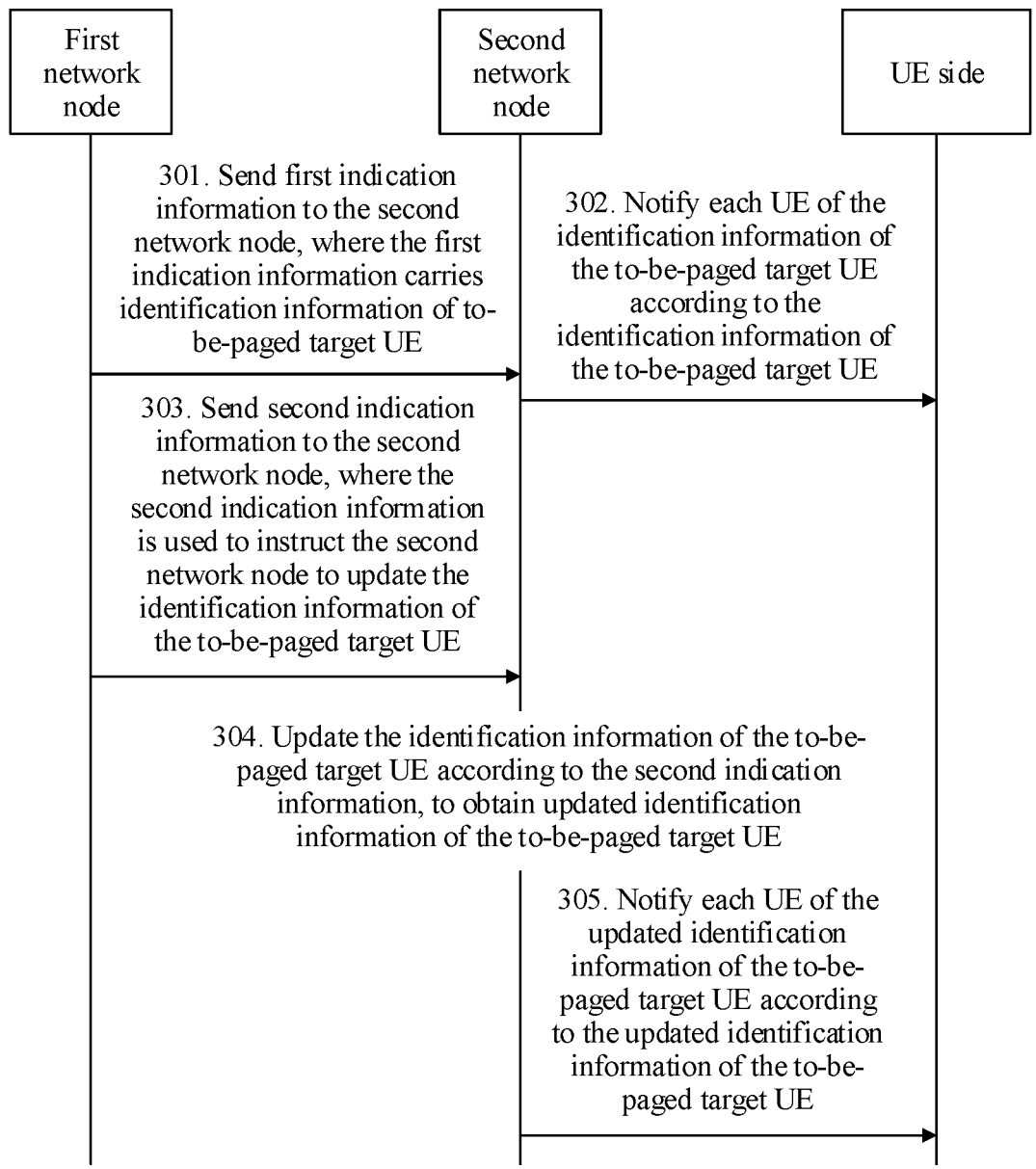
FIG. 3 is a flowchart of another method for sending a paging message according to this application.

Referring to FIG. 3, another embodiment of a method for sending a paging message in this application includes the following steps.

301. A first network node sends first indication information to a second network node, where the first indication information carries identification information of to-be-paged target UE.

In this embodiment, the first network node and the second network node are nodes in a network system. One first network node may be connected to one second network node, or one first network node may be connected to at least two second network nodes, that is, at least two second network nodes share one first network node.

When the network system needs to page the to-be-paged target UE, the first network node may not generate a paging message, and send only the first indication information to the second network node, where the first indication information carries the identification information of the to-be-paged target UE, and the identification information includes an access stratum identifier or a non-access stratum identifier.

302. The second network node notifies each UE of the identification information of the to-be-paged target UE according to the identification information of the to-be-paged target UE.

In this embodiment, after receiving the first indication information sent by the first network node, the second network node reads the identification information of the to-be-paged target UE in the first indication information, determines a sending occasion based on the identification information of the to-be-paged target UE, generates a paging message on the sending occasion, and notifies each UE in the network system of the identification information of the to-be-paged target UE based on the determined sending occasion by using the paging message.

The second network node notifies all the UEs in the network system that the target UE corresponding to the identification information of the to-be-paged target UE needs to be paged, and each of all the UEs in the network system receives a notification that carries the identification information of the to-be-paged target UE, so as to determine whether the UE is to be paged.

303. The first network node sends second indication information to the second network node, where the second indication information is used to instruct the second network node to update the identification information of the to-be-paged target UE.

In this embodiment, because the first network node may want to update the identification information of the target UE in the paging message, the first network node may send the second indication information to the second network node, where the second indication information is used to instruct the second network node to update the identification information of the to-be-paged target UE.

304. The second network node updates the identification information of the to-be-paged target UE according to the second indication information, to obtain updated identification information of the to-be-paged target UE.

In this embodiment, after receiving the second indication information sent by the first network node, the second network node updates the identification information of the to-be-paged target UE according to the second indication information, to obtain the updated identification information of the to-be-paged target UE.

305. The second network node notifies each UE of the updated identification information of the to-be-paged target UE according to the updated identification information of the to-be-paged target UE.

In this embodiment, after updating the identification information of the to-be-paged target UE according to the second indication information, the second network node determines a sending occasion, generates a paging message on the sending occasion, and notifies each UE in the network system of the updated identification information of the to-be-paged target UE based on the determined sending occasion by using the paging message.

The second network node notifies all the UEs in the network system that the target UE corresponding to the updated identification information of the to-be-paged target UE needs to be paged, and each of all the UEs in the network system receives a notification that carries the updated identification information of the to-be-paged target UE, so as to determine whether the UE is to be paged.

In some possible embodiments of this application, that the first network node sends the second indication information to the second network node may include the following:

If the first network node receives a paging response of first UE in the target UE, and determines, based on the paging response, that identification information of the first UE is invalid, the first network node sends, to the second network node, second indication information used to instruct to delete the identification information of the first UE in the paging message; and/or the first network node sends, to the second network node, second indication information used to instruct to add identification information of second UE.

Correspondingly, on the side of the second network node, the second network node receives the second indication information that is sent by the first network node and that is used to instruct to delete the identification information of the first UE in the paging message; and/or the second network node receives the second indication information that is sent by the first network node and that is used to instruct to add the identification information of the second UE to the paging message.

In this embodiment, if the first network node receives the paging response of the first UE in the target UE, the first network node may determine that the identification information of the first UE is invalid, that is, it is unnecessary to page the first UE anymore. Therefore, the first network node sends, to the second network node, the indication information used to instruct to delete the identification information of the first UE in the paging message. It may be understood that, after the second network node deletes the identification information of the first UE in the paging message, the identification information of the to-be-paged target UE is updated.

In addition, for a specific description of the paging response, refer to the foregoing embodiments of this application. Details are not described herein again.

It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion.

Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

In some possible embodiments of this application, the first indication information further carries paging configuration information, or the second indication information carries paging configuration information. Therefore, the method may further include the following: The second network node determines a sending occasion of the paging message based on the paging configuration information. For specific related descriptions, refer to the foregoing embodiments. Details are not described herein again.

In some possible embodiments of this application, functions of the first network node and the second network node are described. Specifically, the first network node has at least one of a radio resource control layer function, a service data adaptation layer function, and a packet data convergence protocol layer function; and/or the second network node has at least one of a radio link control layer function, a media access control layer function, and a physical layer function.

Further, the packet data convergence protocol layer function includes at least one of a packet data convergence protocol layer control plane function and a packet data convergence protocol layer user plane function.

For related descriptions of the functions of the first network node and the second network node, refer to the foregoing embodiment. Details are not described herein again.

This embodiment provides a method for generating and updating a paging message by a second network node.

The following describes the method for sending a paging message in this application by using specific scenario instances.

Figure 4:
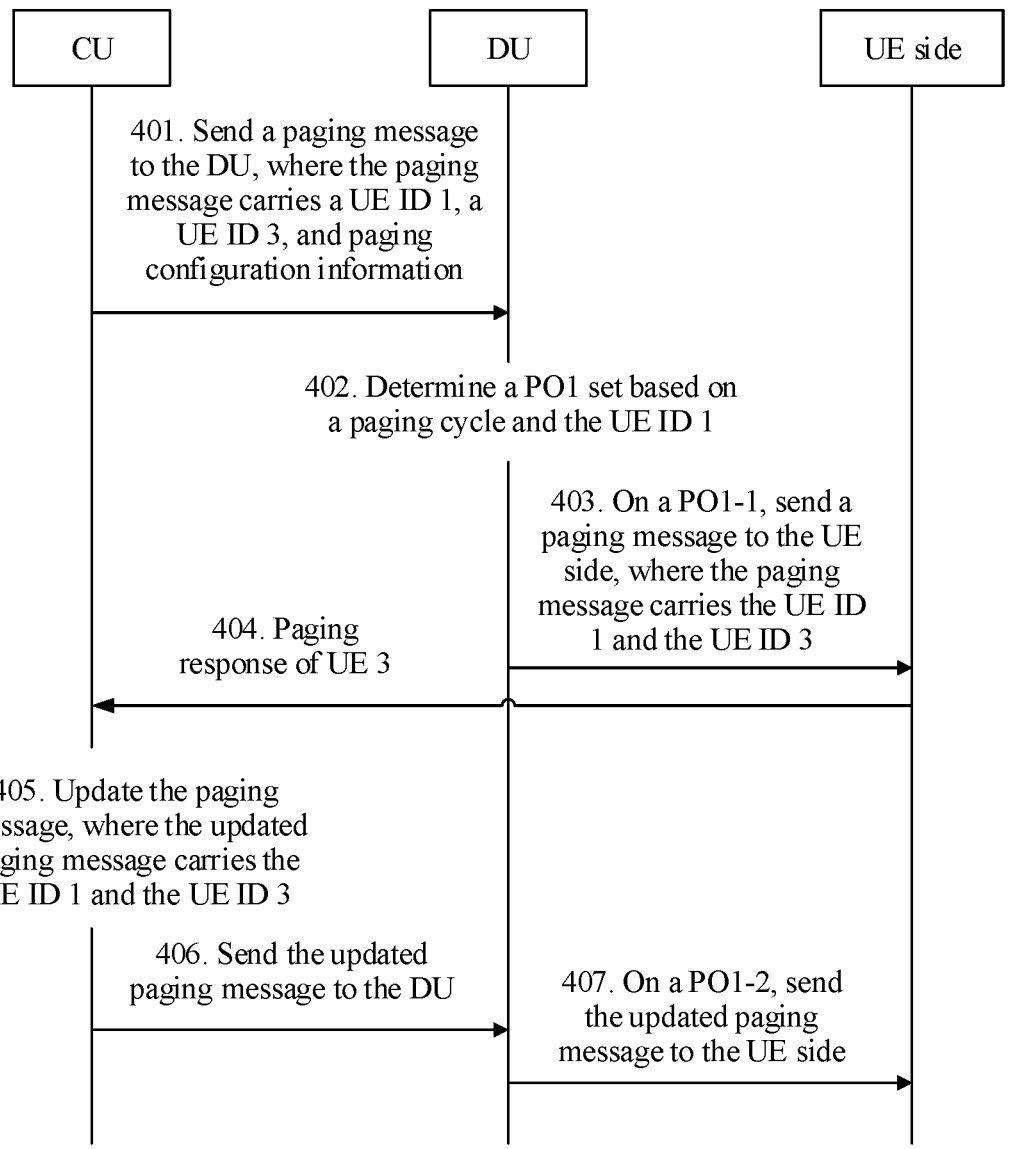
FIG. 4 is a flowchart of another method for sending a paging message according to this application.

Scenario instance 1: Referring to FIG. 4, a CU is equivalent to a first network node, and a DU is equivalent to a second network node. A set of to-be-paged target UEs in a PO1 set includes UE 1, UE 2, and UE 3. That is, a paging occasion determined by using an identifier UE ID 1 of the UE 1, a paging occasion determined by using an identifier UE ID 2 of the UE 2, and a paging occasion determined by using an identifier UE ID 3 of the UE 3 are the same and all are the PO1 set. The identifier of the to-be-paged target UE includes an access stratum identifier, a non-access stratum identifier, an identifier determined based on the access stratum identifier, or an identifier determined based on the non-access stratum identifier. The following describes a method for sending a paging message shown in FIG. 4.

Step 401: The CU sends a paging message to the DU, where the paging message carries the UE ID 1, the UE ID 3, and paging configuration information.

UE ID information in the paging message is transparent to the DU. For example, the paging configuration information includes a paging cycle and the identifier UE ID 1 of the UE 1. When the CU needs to page the UE 1 and the UE 3, the CU sends the paging cycle, the UE ID 1, and the paging message that carries the UE ID 1 and the UE ID 3, where information in the paging message is transparent to the DU. Specifically, an index of the paging message may be further configured, so that the DU determines a corresponding paging occasion set based on the index of the paging message. For example, the CU sends the paging cycle, the UE ID 1, and a paging message 1 to the DU, where a paging message corresponding to the paging message 1 carries the UE ID 1 and the UE ID 3. It should be noted that the DU does not know the PO1 set in this case.

Step 402: The DU determines the PO1 set based on the paging cycle and the UE ID 1.

The DU determines the PO1 set based on the paging cycle and the UE ID 1. For example, the PO1 set includes a PO1-1 and a PO1-2.

Step 403: On the PO1-1, the DU sends a paging message to the UE side, where the paging message carries the UE ID 1 and the UE ID 3.

Step 404: The CU receives a paging response of the UE 3.

For a specific description of the paging response, refer to the foregoing embodiments of this application. Details are not described herein again.

Step 405: The CU updates the paging message, where the updated paging message carries the UE ID 1 and the UE ID 2.

Because the CU receives the paging response of the UE 3 and needs to additionally page the UE 2, the CU updates the paging message, and the updated paging message carries the UE ID 1 and the UE ID 2.

Step 406: The CU sends the updated paging message to the DU.

The updated paging message carries the UE ID 1 and the UE ID 2.

In a feasible implementation, the CU sends the paging configuration information to the DU. For a related description, refer to the description in step 401. Details are not described herein again.

In another feasible implementation, the CU may indicate an index of the updated paging message, so that the DU can determine a corresponding paging occasion set based on the index of the updated paging message. For example, if the index of the paging message is 1, the DU may determine that the updated paging message needs to be sent on a paging occasion in the PO1 set.

Step 407: On the PO1-2, the DU sends the updated paging message to the UE side.

Figure 5:
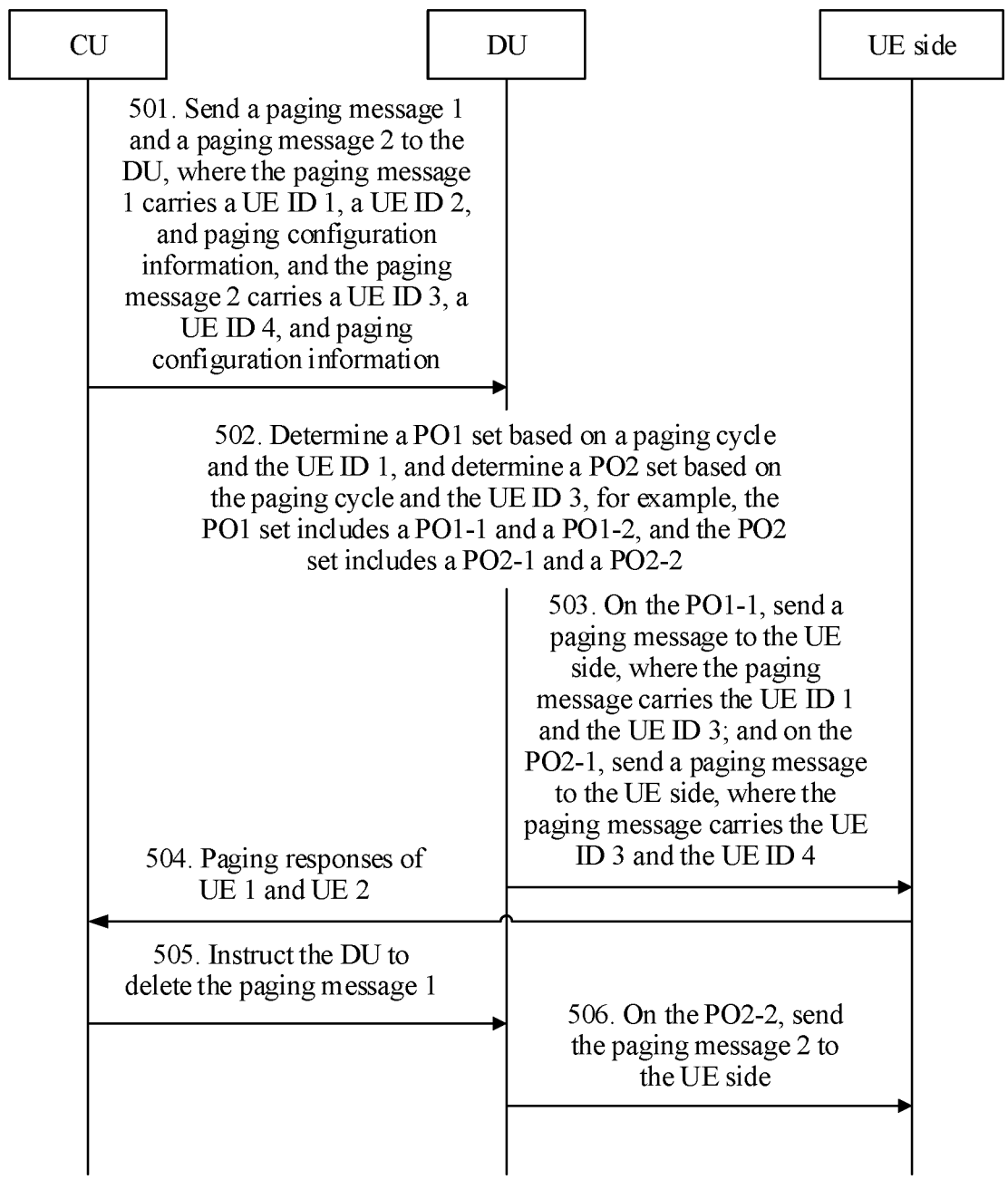
FIG. 5 is a flowchart of another method for sending a paging message according to this application.

Scenario instance 2: Referring to FIG. 5, a CU is equivalent to a first network node, and a DU is equivalent to a second network node. A set of to-be-paged target UEs in a PO1 set includes UE 1 and UE 2, and a set of to-be-paged target UEs in a PO2 set includes UE 3 and UE 4. That is, a paging occasion determined by using an identifier UE ID 1 of the UE 1 and a paging occasion determined by using an identifier UE ID 2 of the UE 2 are the same, and both are the PO1 set. A paging occasion determined by using an identifier UE ID 3 of the UE 3 and a paging occasion determined by using an identifier UE ID 4 of the UE 4 are the same, both are the PO2 set, and are different from the paging occasions determined by using the UE ID 1 and the UE ID 2. That is, the PO1 set and the PO2 set are not the same. The identifier of the to-be-paged target UE includes an access stratum identifier, a non-access stratum identifier, an identifier determined based on the access stratum identifier, or an identifier determined based on the non-access stratum identifier. The following describes a method for sending a paging message shown in FIG. 5.

Step 501: The CU sends a paging message 1 and a paging message 2 to the DU, where the paging message 1 carries the UE ID 1, the UE ID 2, and paging configuration information, and the paging message 2 carries the UE ID 3, the UE ID 4, and paging configuration information.

UE ID information in the paging message is transparent to the DU. For example, the paging configuration information includes a paging cycle and the identifier UE ID 1 of the UE 1. When the CU needs to page the UE 1 and the UE 2, the CU sends the paging cycle, the UE ID 1, and a paging message that carries the UE ID 1 and the UE ID 2, where information in the paging message is transparent to the DU. Specifically, an index of the paging message may be further configured, so that the DU determines a corresponding paging occasion set based on the index of the paging message. For example, the CU sends the paging cycle, the UE ID 1, and the paging message 1 to the DU, where a paging message corresponding to the paging message 1 carries the UE ID 1 and the UE ID 2. It should be noted that the DU does not know the PO1 set in this case.

Similarly, when the CU needs to page the UE 3 and the UE 4, the CU sends the paging cycle, the UE ID 3, and a paging message that carries the UE ID 3 and the UE ID 4, where information in the paging message is transparent to the DU. Specifically, an index of the paging message may be further configured, so that the DU determines a corresponding paging occasion set based on the index of the paging message. For example, the CU sends the paging cycle, the UE ID 3, and the paging message 2 to the DU, where a paging message corresponding to the paging message 2 carries the UE ID 3 and the UE ID 4. It should be noted that the DU does not know the PO2 set in this case.

Step 502: The DU determines the PO1 set based on the paging cycle and the UE ID 1, and determines the PO2 set based on the paging cycle and the UE ID 3, for example, the PO1 set includes a PO1-1 and a PO1-2, and the PO2 set includes a PO2-1 and a PO2-2.

Step 503: On the PO1-1, the DU sends a paging message to the UE side, where the paging message carries the UE ID 1 and the UE ID 2; and on the PO2-1, the DU sends a paging message to the UE side, where the paging message carries the UE ID 3 and the UE ID 4.

Step 504: The CU receives paging responses of the UE 1 and the UE 2.

For a specific description of the paging response, refer to the foregoing embodiments of this application. Details are not described herein again.

Step 505: The CU instructs the DU to delete the paging message 1.

In a feasible implementation, the CU sends the paging configuration information to the DU to instruct the DU to delete a paging message on a paging occasion determined by using the paging configuration information. For related descriptions of determining the paging occasion, refer to the description in step 401. Details are not described herein again.

In another feasible implementation, the CU may indicate an index of a to-be-deleted paging message, so that the DU can determine a corresponding paging occasion set according to the indication, and the DU no longer sends a paging message on the paging occasion. For example, if the CU indicates that the index of the to-be-deleted paging message is 1, the DU may determine that no paging message needs to be sent on a paging occasion in the PO1 set.

Step 506: On the PO2-2, the DU sends the paging message 2 to the UE side.

After the DU deletes the paging message 1, the DU no longer sends the paging message 1 on the PO1-2. On the PO2-2, the DU continues to send the paging message 2 to the UE side.

Figure 6:
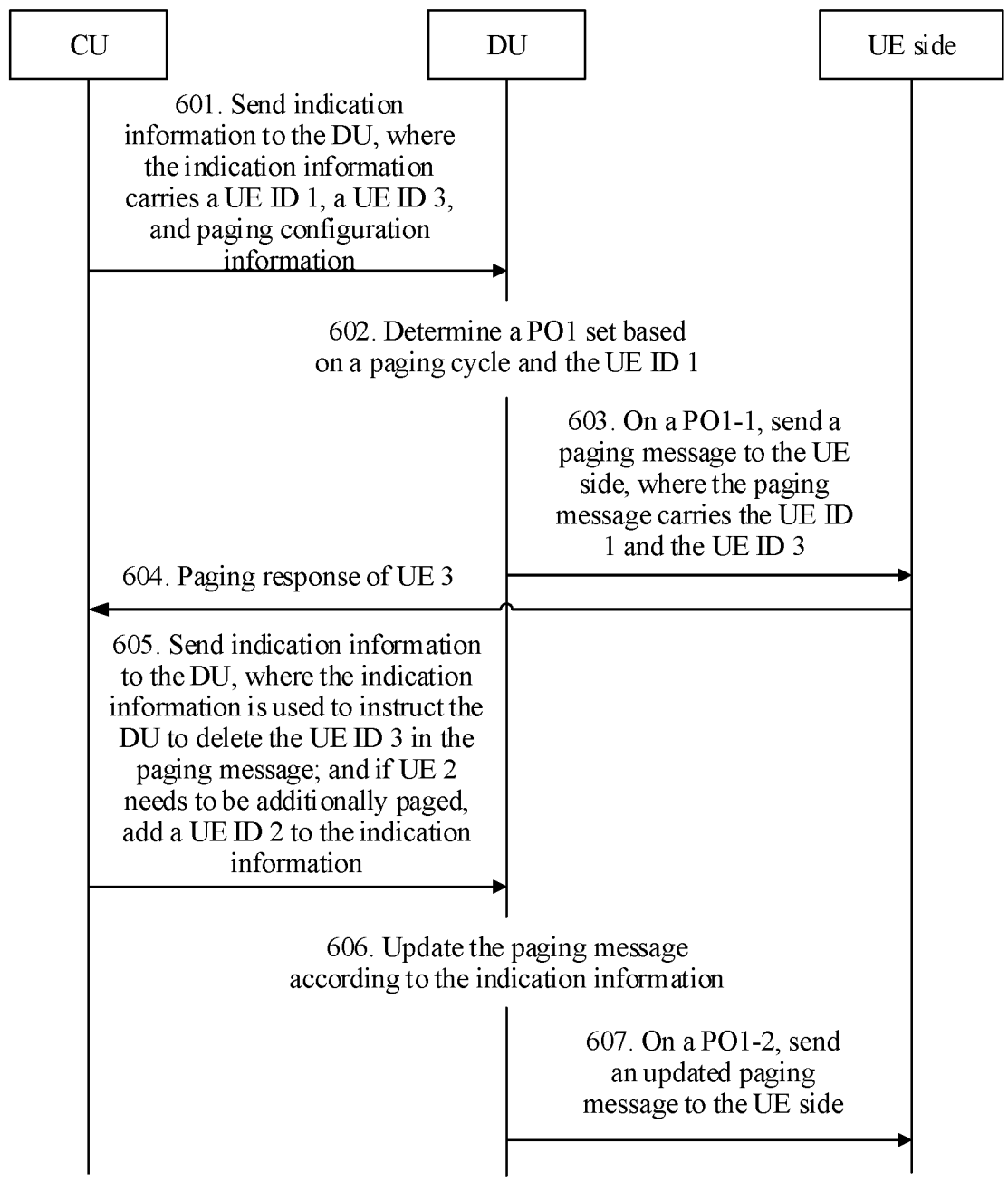
FIG. 6 is a flowchart of another method for sending a paging message according to this application.

Scenario instance 3: Referring to FIG. 6, a CU is equivalent to a first network node, and a DU is equivalent to a second network node. A set of to-be-paged target UEs in a PO1 set includes UE 1, UE 2, and UE 3. That is, a paging occasion determined by using an identifier UE ID 1 of the UE 1, a paging occasion determined by using an identifier UE ID 2 of the UE 2, and a paging occasion determined by using an identifier UE ID 3 of the UE 3 are the same and all are the PO1 set. The identifier of the to-be-paged target UE includes an access stratum identifier, a non-access stratum identifier, an identifier determined based on the access stratum identifier, or an identifier determined based on the non-access stratum identifier. The following describes a method for sending a paging message shown in FIG. 6.

Step 601: The CU sends indication information to the DU, where the indication information carries the UE ID 1, the UE ID 3, and paging configuration information.

For example, paging configuration parameters include a paging cycle, the identifier UE ID 1 of the UE 1, and the identifier UE ID 3 of the UE 3. The CU needs to page the UE 1 and the UE 3. However, the CU does not generate a paging message, and sends only the paging cycle, the UE ID 1, and the UE ID 3 to the DU.

Step 602: The DU determines the PO1 set based on the paging cycle and the UE ID 1.

The DU determines the PO1 set based on the paging cycle and the UE ID 1. For example, the PO1 set includes a PO1-1 and a PO1-2.

Step 603: On the PO1-1, the DU sends a paging message to the UE side, where the paging message carries the UE ID 1 and the UE ID 3.

Step 604: The CU receives a paging response of the UE 3.

For a specific description of the paging response, refer to the foregoing embodiments of this application. Details are not described herein again.

Step 605: The CU sends indication information to the DU, where the indication information is used to instruct the DU to delete the UE ID 3 in the paging message. If the CU further needs to page the UE 2, the CU adds the UE ID 2 to the indication information.

Step 606: The DU updates the paging message according to the indication information.

The DU reassembles identification information in the paging message according to the indication information, that is, deletes the UE ID 3 in the paging message and adds the UE ID 2 to the paging message.

Step 607: On the PO1-2, the DU sends an updated paging message to the UE side.

The updated paging message carries the UE ID 1 and the UE ID 2.

Figure 7:
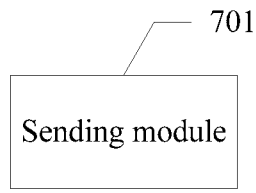
FIG. 7 is a structural diagram of a first network node according to this application.

The foregoing describes the method for sending a paging message in this application by using embodiments. The following describes a network node in this application by using embodiments. First, a first network node in this application is described. Referring to FIG. 7, an embodiment of the first network node in this application includes:

a sending module 701, configured to send a paging message to a second network node, where the paging message carries indication information, and the indication information is used to indicate a paging cause.

In this embodiment, because the paging message sent by the sending module 701 to the second network node carries the indication information used to indicate the paging cause, the second network node can notify each UE of the paging cause according to the indication information. Therefore, the paging cause can be notified to each UE in this application.

Further, in some possible embodiments, a related description is provided for the paging cause, for example, the paging cause includes a system message change cause.

In some possible embodiments, a related description is provided for the system message change cause. For example, the system message change cause includes at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible embodiments, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

The packet data convergence protocol layer function includes at least one of a packet data convergence protocol layer control plane function and a packet data convergence protocol layer user plane function.

Figure 8:
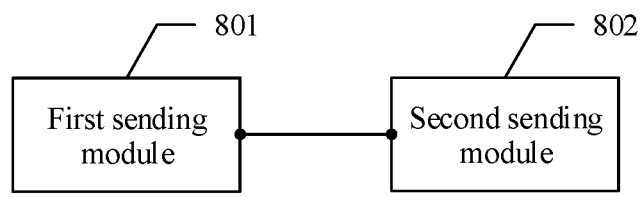
FIG. 8 is a structural diagram of another first network node according to this application.

Referring to FIG. 8, another embodiment of a first network node in this application includes:

a first sending module 801, configured to send a paging message to a second network node, where the paging message carries identification information of to-be-paged target user equipment UE; and a second sending module 802, configured to send an updated paging message to the second network node, where the updated paging message carries updated identification information of the to-be-paged target UE, or configured to send indication information to the second network node, where the indication information is used to instruct the second network node to update the identification information of the to-be-paged target UE; or a first sending module 801, configured to send first indication information to a second network node, where the first indication information carries identification information of to-be-paged target user equipment UE; and a second sending module 802, configured to send second indication information to the second network node, where the second indication information is used to instruct the second network node to update the identification information of the to-be-paged target UE.

In this embodiment, because the first network node may continuously update the identification information of the target UE in the paging message, a method for generating and sending the updated paging message to the second network node by the first network node is provided, and a method for generating and updating the paging message by the second network node is provided.

Figure 9:
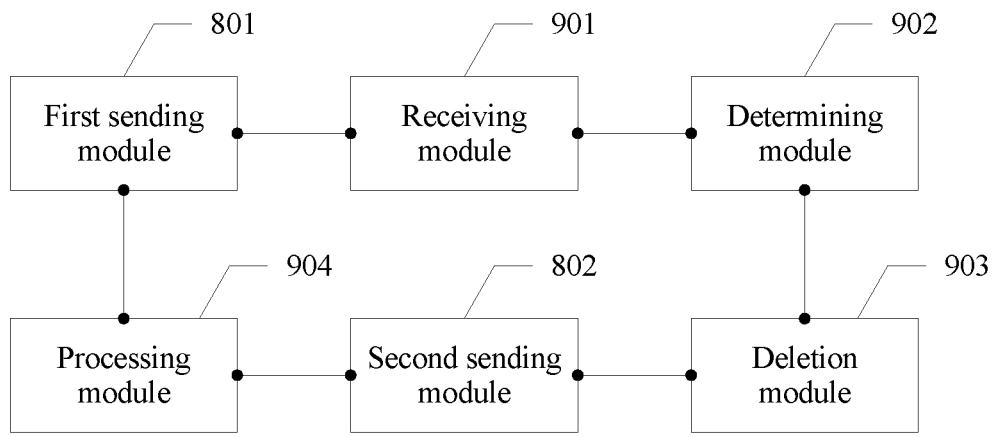
FIG. 9 is a structural diagram of another first network node according to this application.

Further, referring to FIG. 9, in some possible embodiments, the first network node further includes:

a receiving module 901, configured to receive a paging response of first UE in the target UE;

a determining module 902, configured to determine, based on the paging response, that identification information of the first UE is invalid;

a deletion module 903, configured to delete the identification information of the first UE in the paging message; and/or a processing module 904, configured to add identification information of second UE to the paging message.

It may be learned that, if the first network node receives the paging response of the first UE in the target UE, the first network node may determine that the identification information of the first UE is invalid, that is, it is unnecessary to page the first UE anymore. Therefore, the first network node deletes the identification information of the first UE in the paging message. It may be understood that, after the identification information of the first UE in the paging message is deleted, the identification information of the to-be-paged target UE is updated.

It should be noted that if the first network node receives paging responses of all target UEs on a paging occasion, the first network node may determine that identification information of all the target UEs on the paging occasion is invalid, that is, it is unnecessary to page the target UEs on the paging occasion anymore. Therefore, the first network node may instruct the second network node to stop notifying each UE of the identification information of the to-be-paged target UE on the paging occasion, that is, the first network node may instruct the second network node to stop paging the target UE on the paging occasion.

Similarly, if the first network node needs to additionally page the second UE, that is, the first network node determines to add the identification information of the second UE to the identification information of the target UE, the first network node adds the identification information of the second UE to the identification information of the second UE.

Figure 10:
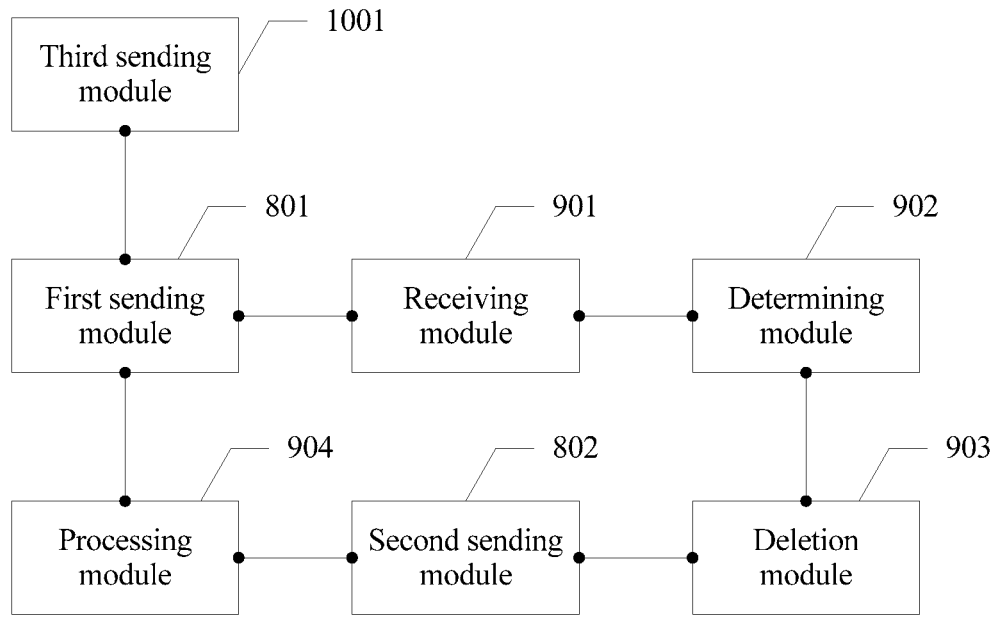
FIG. 10 is a structural diagram of another first network node according to this application.

Further, referring to FIG. 10, in some possible embodiments, the first network node further includes:

a third sending module 1001, configured to send sending times information of the paging message and/or priority information of the paging message to the second network node.

It may be learned that, the first network node may send the sending times information of the paging message to the second network node, and the sending times may be preconfigured. In addition, to ensure successful sending of the paging message, the first network node may increase a priority of the paging message, and then the first network node may indicate the priority information of the paging message to the second network node.

Further, in some possible embodiments, the paging message further carries paging configuration information, and the paging configuration information is used by the second network node to determine a sending occasion of the paging message.

The paging configuration information may include at least one of the following information: a paging cycle, an identifier of the to-be-paged target UE, and a PO. The identifier of the to-be-paged target UE includes an access stratum identifier, a non-access stratum identifier, an identifier determined based on the access stratum identifier, or an identifier determined based on the non-access stratum identifier. It should be noted that the PO is the sending occasion of the paging message.

In some possible embodiments, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

The packet data convergence protocol layer function includes at least one of a packet data convergence protocol layer control plane function and a packet data convergence protocol layer user plane function.

In some possible embodiments, the second sending module 802 is specifically configured to: if a paging response of first UE in the target UE is received, and it is determined, based on the paging response, that identification information of the first UE is invalid, send, to the second network node, second indication information used to instruct to delete the identification information of the first UE in the paging message; and/or send, to the second network node, second indication information used to instruct to add identification information of second UE.

It may be learned that, if the first network node receives the paging response of the first UE in the target UE, the first network node may determine that the identification information of the first UE is invalid, that is, it is unnecessary to page the first UE anymore. Therefore, the first network node sends, to the second network node, the indication information used to instruct to delete the identification information of the first UE in the paging message. It may be understood that, after the second network node deletes the identification information of the first UE in the paging message, the identification information of the to-be-paged target UE is updated.

It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion.

Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

Figure 11:
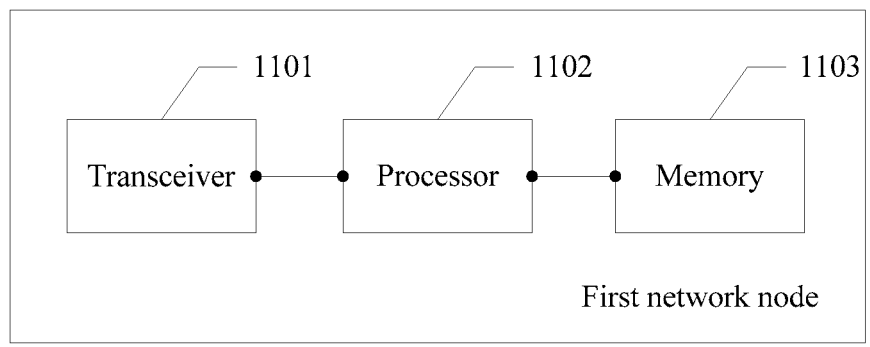
FIG. 11 is a structural diagram of another first network node according to this application.

The foregoing describes the first network node in this application from a perspective of a modular functional entity. The following describes the first network node in this application from a perspective of hardware processing. Referring to FIG. 11, the first network node in this application includes a transceiver 1101, a processor 1102, and a memory 1103.

The first network node in this application may have more or fewer components than those shown in FIG. 11, may combine two or more components, or may have different component configurations or settings. Various components may be implemented in hardware including one or more signal processing and/or application-specific integrated circuits, in software, or in a combination of hardware and software.

The transceiver 1101 is configured to perform the following operation:
sending a paging message to a second network node, where the paging message carries indication information, and the indication information is used to indicate a paging cause.

The transceiver 1101 is further configured to perform the following operations:
sending a paging message to a second network node, where the paging message carries identification information of to-be-paged target user equipment UE; and
sending an updated paging message to the second network node, where the updated paging message carries updated identification information of the to-be-paged target UE.

The transceiver 1101 is further configured to perform the following operations:
sending first indication information to a second network node, where the first indication information carries identification information of to-be-paged target user equipment UE; and
sending second indication information to the second network node, where the second indication information is used to instruct the second network node to update the identification information of the to-be-paged target UE.

In this embodiment, because the paging message sent by the transceiver 1101 to the second network node carries the indication information used to indicate the paging cause, the second network node can notify each UE of the paging cause according to the indication information. Therefore, the paging cause can be notified to each UE in this application.

In addition, because the first network node may continuously update the identification information of the target UE in the paging message, a method for generating and sending the updated paging message to the second network node by the first network node is provided, and a method for generating and updating the paging message by the second network node is provided.

The transceiver 1101 is further configured to perform the following operation:
receiving a paging response of first UE in the target UE.
The processor 1102 is configured to perform the following operations:
determining, based on the paging response, that identification information of the first UE is invalid;
deleting the identification information of the first UE in the paging message; and/or
adding identification information of second UE to the paging message.

The transceiver 1101 is further configured to perform the following operation:
sending times information of the paging message and/or priority information of the paging message to the second network node.

The transceiver 1101 is further configured to perform the following operation:
if a paging response of first UE in the target UE is received, and it is determined, based on the paging response, that identification information of the first UE is invalid, sending, to the second network node, indication information used to instruct to delete the identification information of the first UE in the paging message; and/or sending, to the second network node, indication information used to instruct to add identification information of second UE to the paging message.

The memory 1103 is configured to store an instruction required by the processor 1102 to perform a corresponding operation.

Figure 12:
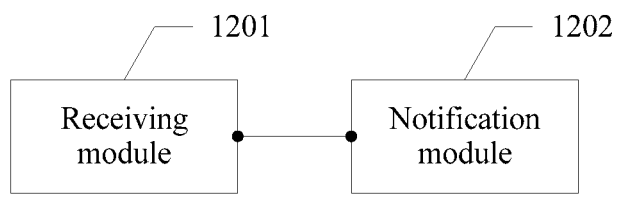
FIG. 12 is a structural diagram of a second network node according to this application.

The following describes a second network node in this application. Referring to FIG. 12, an embodiment of the second network node in this application includes:
a receiving module 1201, configured to receive a paging message sent by a first network node, where the paging message carries indication information, and the indication information is used to indicate a paging cause; and
a notification module 1202, configured to notify each user equipment UE of the paging cause according to the indication information.

In this embodiment, because the paging message sent by the first network node to the second network node carries the indication information used to indicate the paging cause, the notification module 1202 can notify each UE of the paging cause according to the indication information. Therefore, the paging cause can be notified to each UE in this application.

Further, in some possible embodiments, the notification module 1202 is specifically configured to send downlink control information DCI to each UE according to the indication information, where the DCI carries preset indication information, and the preset indication information is used to notify each UE of the paging cause.

In some possible embodiments, a related description is provided for the paging cause, for example, the paging cause includes a system message change cause.

In some possible embodiments, a related description is provided for the system message change cause. For example, the system message change cause includes at least one of the following information: a system message modification, a system message modification during long discontinuous reception, a system message change of an earthquake and tsunami warning system, a system message change of a commercial mobile alert system, and a system message change of a multicast broadcast intra-frequency network.

In some possible embodiments, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

The packet data convergence protocol layer function includes at least one of a packet data convergence protocol layer control plane function and a packet data convergence protocol layer user plane function.

Figure 13:
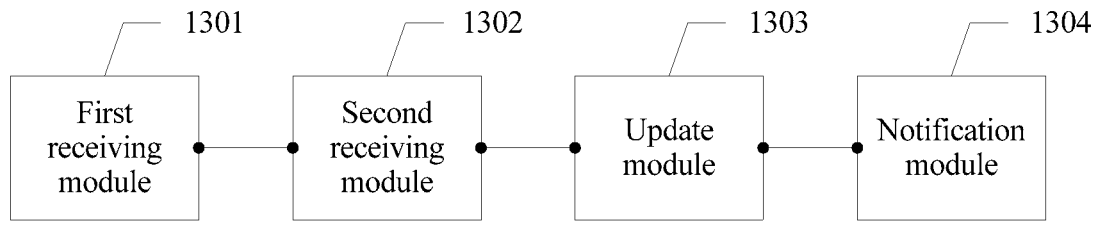
FIG. 13 is a structural diagram of another second network node according to this application.

Referring to FIG. 13, another embodiment of a second network node in this application includes:

a first receiving module 1301, configured to receive first indication information sent by a first network node, where the first indication information carries identification information of to-be-paged target user equipment UE;

a second receiving module 1302, configured to receive second indication information sent by the first network node, where the second indication information is used to instruct the second network node to update the identification information of the to-be-paged target UE;

an update module 1303, configured to update the identification information of the to-be-paged target UE according to the second indication information, to obtain updated identification information of the to-be-paged target UE; and a notification module 1304, configured to notify each UE of the updated identification information of the to-be-paged target UE according to the updated identification information of the to-be-paged target UE.

This embodiment provides a method for generating and updating a paging message by the second network node.

Further, in some possible embodiments, the second receiving module 1302 is specifically configured to receive second indication information that is sent by the first network node and that is used to instruct to delete identification information of first UE; and/or receive second indication information that is sent by the first network node and that is used to instruct to add identification information of second UE.

It may be learned that, if the first network node receives a paging response of the first UE in the target UE, the first network node may determine that the identification information of the first UE is invalid, that is, it is unnecessary to page the first UE anymore. Therefore, the first network node sends, to the second network node, the indication information used to instruct to delete the identification information of the first UE in the paging message. It may be understood that, after the second network node deletes the identification information of the first UE in the paging message, the identification information of the to-be-paged target UE is updated.

It should be noted that if the first network node receives paging responses of all target UEs on a paging occasion, the first network node may determine that identification information of all the target UEs on the paging occasion is invalid. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion.

Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

Figure 14:
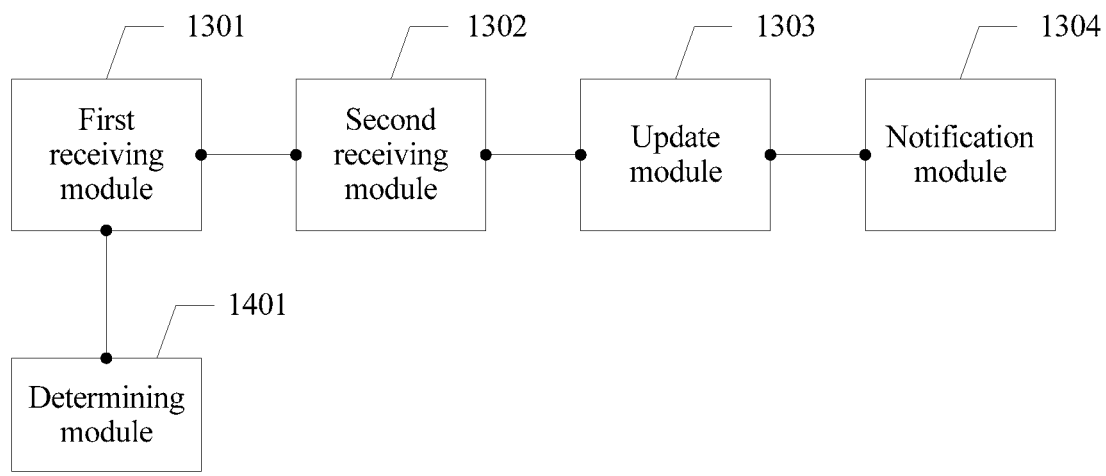
FIG. 14 is a structural diagram of another second network node according to this application.

Further, referring to FIG. 14, in some possible embodiments, the paging message further carries paging configuration information, and the second network node further includes:

a determining module 1401, configured to determine a sending occasion of the paging message based on the paging configuration information.

The paging configuration information may include at least one of the following information: a paging cycle, an identifier of the to-be-paged target UE, and a PO. The identifier of the to-be-paged target UE includes an access stratum identifier, a non-access stratum identifier, an identifier determined based on the access stratum identifier, or an identifier determined based on the non-access stratum identifier. It should be noted that the PO is the sending occasion of the paging message.

In some possible embodiments, functions of the first network node and the second network node are described. For example, the first network node has at least one of a radio resource control layer function, a service data adaptation layer function, and a packet data convergence protocol layer function; and/or the second network node has at least one of a radio link control layer function, a media access control layer function, and a physical layer function.

In some possible embodiments, the packet data convergence protocol layer function includes at least one of a packet data convergence protocol layer control plane function and a packet data convergence protocol layer user plane function.

Figure 15:
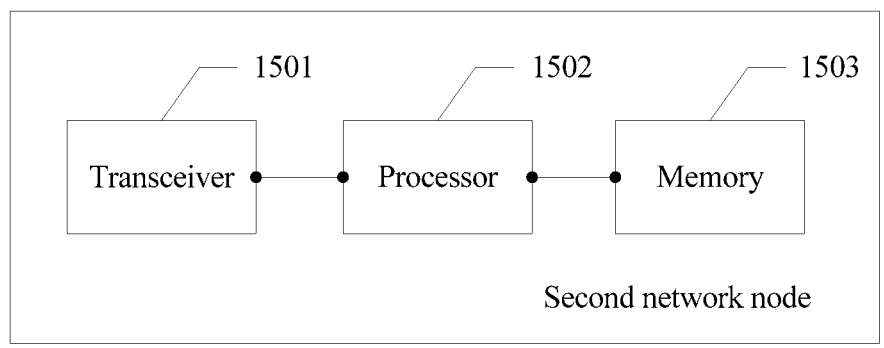
FIG. 15 is a structural diagram of another second network node according to this application.

The foregoing describes the second network node in this application from a perspective of a modular functional entity. The following describes the second network node in this application from a perspective of hardware processing. Referring to FIG. 15, the second network node in this application includes a transceiver 1501, a processor 1502, and a memory 1503.

The second network node in this application may have more or fewer components than those shown in FIG. 15, may combine two or more components, or may have different component configurations or settings. Various components may be implemented in hardware including one or more signal processing and/or application-specific integrated circuits, in software, or in a combination of hardware and software.

The transceiver 1501 is configured to perform the following operations:

receiving a paging message sent by a first network node, where the paging message carries indication information, and the indication information is used to indicate a paging cause; and notifying each user equipment UE of the paging cause according to the indication information.

The transceiver 1501 is further configured to perform the following operations:

receiving first indication information sent by a first network node, where the first indication information carries identification information of to-be-paged target user equipment UE; and receiving second indication information sent by the first network node, where the second indication information is used to instruct the second network node to update the identification information of the to-be-paged target UE.

The processor 1502 is configured to perform the following operation:

updating the identification information of the to-be-paged target UE according to the second indication information, to obtain updated identification information of the to-be-paged target UE.

The transceiver 1501 is further configured to perform the following operation:

notifying each UE of the updated identification information of the to-be-paged target UE according to the updated identification information of the to-be-paged target UE.

In this embodiment, because the paging message sent by the first network node to the second network node carries the indication information used to indicate the paging cause, the transceiver 1501 can notify each UE of the paging cause according to the indication information. Therefore, the paging cause can be notified to each UE in this application.

In addition, a method for generating and updating the paging message by the second network node is provided.

The transceiver 1501 is further configured to perform the following operation:

sending downlink control information DCI to each UE according to the indication information, where the DCI carries preset indication information, and the preset indication information is used to notify each UE of the paging cause.

The transceiver 1501 is further configured to perform the following operations:

receiving second indication information that is sent by the first network node and that is used to instruct to delete identification information of first UE; and/or receiving second indication information that is sent by the first network node and that is used to instruct to add identification information of second UE.

It may be learned that, if the first network node receives a paging response of the first UE in the target UE, the first network node may determine that the identification information of the first UE is invalid, that is, it is unnecessary to page the first UE anymore. Therefore, the first network node sends, to the second network node, the indication information used to instruct to delete the identification information of the first UE in the paging message. It may be understood that, after the second network node deletes the identification information of the first UE in the paging message, the identification information of the to-be-paged target UE is updated.

It should be noted that if the first network node receives paging responses of all target UEs on a paging occasion, the first network node may determine that identification information of all the target UEs on the paging occasion is invalid, and it is unnecessary to page the target UEs anymore. Therefore, the first network node may instruct the second network node to delete the identification information of all the target UEs on the paging occasion. The second network node deletes the identification information of all the target UEs on the paging occasion, that is, it is unnecessary to page the target UEs on the paging occasion anymore, and the second network node stops paging the target UEs on the paging occasion.

Similarly, if the first network node needs to additionally page the second UE, that is, the first network node determines to add the identification information of the second UE to the identification information of the target UE, the first network node sends, to the second network node, the second indication information used to instruct to add the identification information of the second UE to the paging message.

If the paging message further carries paging configuration information, the processor 1502 is further configured to perform the following operation:

determining a sending occasion of the paging message based on the paging configuration information.

The paging configuration information may include at least one of the following information: a paging cycle, an identifier of the to-be-paged target UE, and a PO. The identifier of the to-be-paged target UE includes an access stratum identifier, a non-access stratum identifier, an identifier determined based on the access stratum identifier, or an identifier determined based on the non-access stratum identifier. It should be noted that the PO is the sending occasion of the paging message.

The first network node has at least one of a radio resource control layer function, a service data adaptation layer function, and a packet data convergence protocol layer function; and/or the second network node has at least one of a radio link control layer function, a media access control layer function, and a physical layer function.

The packet data convergence protocol layer function includes at least one of a packet data convergence protocol layer control plane function and a packet data convergence protocol layer user plane function.

The memory 1503 is configured to store an instruction required by the processor 1502 to perform a corresponding operation.

Figure 16:
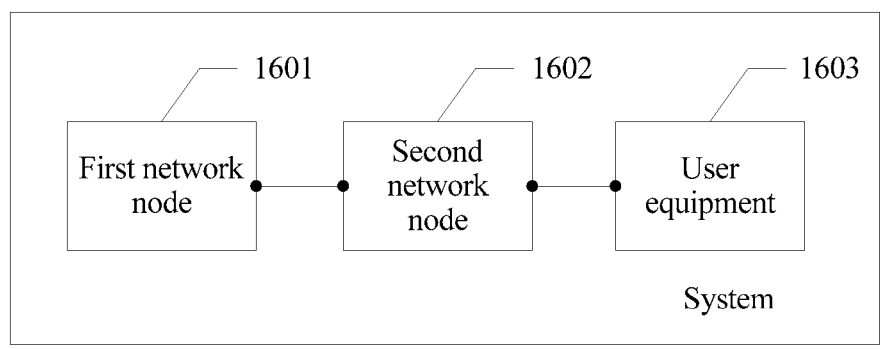
FIG. 16 is a structural diagram of a system according to this application.

Referring to FIG. 16, this application further provides a system, and the system includes a first network node 1601, a second network node 1602, and user equipment 1603.

The first network node 1601 is configured to send a paging message to the second network node 1602, where the paging message carries indication information, and the indication information is used to indicate a paging cause.

The second network node 1602 is configured to notify each user equipment 1603 of the paging cause according to the indication information.

Alternatively, the first network node 1601 is configured to send a paging message to the second network node 1602, where the paging message carries identification information of to-be-paged target user equipment UE;

the second network node 1602 is configured to notify each user equipment 1603 of the identification information of the to-be-paged target user equipment;

the first network node 1601 is further configured to send an updated paging message to the second network node 1602, where the updated paging message carries updated identification information of the to-be-paged target user equipment; and the second network node 1602 is further configured to notify each user equipment 1603 of the updated identification information of the to-be-paged target user equipment.

Alternatively, the first network node 1601 is configured to send first indication information to the second network node 1602, where the first indication information carries identification information of to-be-paged target user equipment;

the second network node 1602 is configured to notify each user equipment 1603 of the identification information of the to-be-paged target user equipment according to the identification information of the to-be-paged target user equipment;

the first network node 1601 is further configured to send second indication information to the second network node 1602, where the second indication information is used to instruct the second network node 1602 to update the identification information of the to-be-paged target UE; and the second network node 1602 is further configured to update the identification information of the to-be-paged target user equipment according to the second indication information, to obtain updated identification information of the to-be-paged target user equipment; and notify each user equipment 1603 of the updated identification information of the to-be-paged target user equipment according to the updated identification information of the to-be-paged target user equipment.

In this embodiment, because the paging message sent by the first network node to the second network node carries the indication information used to indicate the paging cause, the second network node can clearly determine a cause for sending the paging message by the first network node, and the second network node can notify each UE of the paging cause.

In addition, because the first network node may continuously update the identification information of the target UE in the paging message, a method for generating and sending the updated paging message to the second network node by the first network node is provided.

Finally, because the first network node may want to continuously update the identification information of the target UE in the paging message, a method for generating and updating the paging message by the second network node is provided.

All or some of the foregoing embodiments may be implemented by using software, hardware, or a combination thereof. When the software or the combination of the software and the hardware is used to implement the embodiments, the embodiments may be implemented completely or partially in a form of a computer program product.

The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instruction may be stored in a storage medium, or transmitted from one storage medium to another storage medium. For example, the computer instructions may be transmitted from a website, computer, server, or data center to another website, computer, server, or data center in a wired (for example, a coaxial cable, a twisted pair, or an optical fiber) or wireless (for example, infrared, wireless, or microwave) manner. The storage medium may be any medium storable by a computer, or a data storage device, such as a server or a data center, integrating one or more media. The medium may be a magnetic medium (for example, a floppy disk, a hard disk, or a magnetic tape), an optical medium (for example, an optical disc), a semiconductor medium (for example, a solid state disk (SSD)), or the like.

It may be clearly understood by a person of ordinary skill in the art that, for ease and brief description, for a detailed working process of the foregoing system, apparatus, and units, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system.

The units described as separate parts may or may not be physically separate, and parts displayed as units may or may not be physical units, may be located in one position, or may be distributed on a plurality of network devices. Some or all of the units may be selected according to actual requirements to achieve the objectives of the solutions of the embodiments in this application.

Related parts of the embodiments of this application may be mutually referenced, including: Related parts of the method embodiments may be mutually referenced; and the apparatuses provided in the apparatus embodiments are configured to perform the methods provided in the corresponding method embodiments. Therefore, for the apparatus embodiments, refer to related parts in the related method embodiments for understanding.

The structural diagrams of the apparatuses provided in the apparatus embodiments of this application show only simplified designs of corresponding apparatuses. In actual application, the apparatus may include any quantity of communication modules, processors, memories, and the like, so as to implement functions or operations performed by the apparatus in the apparatus embodiments of this application, and all apparatuses that can implement this application fall within the protection scope of this application.

In conclusion, the foregoing embodiments are merely intended for describing the technical solutions of this application, rather than limiting this application. A person of ordinary skill in the art may modify the technical solutions described in the foregoing embodiments, but these modifications do not make corresponding technical solutions beyond the scope of the claims.

What is claimed is:

1. A method for sending a paging message, the method comprising:
receiving, from a first network node by a second network node,
the paging message, wherein the paging message carries indication information,
the indication information comprises two or more pre-defined bit patterns,
the a first bit pattern of the pre-defined bit patterns indicates a paging cause and a second bit pattern of the pre-defined bit patterns indicates which system message or system message block, among a plurality of system messages or system message blocks, changes, and
the paging cause comprises one or more of a system message modification, a system message modification during long discontinuous reception, a system message change of a commercial mobile alert system, or a system message change of a multicast broadcast intra-frequency network;
reading, by the second network node, the indication information carried in the paging message;
determining, by the second network node based on the indication information, a cause for sending the paging message by the first network node;
generating, by the second network node, downlink control information (DCI) according to the indication information, wherein the DCI carries second indication information comprising the first bit pattern, and
the first bit pattern indicates the second indication information carried in the DCI comprises the one or more of the system message modification, the system message modification during long discontinuous reception, the system message change of the commercial mobile alert system, or the system message change of the multicast broadcast intra-frequency network; and
sending, by the second network node to a user equipment (UE), the DCI that carries the second indication information.

2. The method according to claim 1, wherein the paging cause further comprises a system message change of an earthquake and tsunami warning system.

3. The method according to claim 1, wherein the first network node has at least one of a radio resource control layer function, a service data adaptation layer function, or a packet data convergence protocol layer function; and
  wherein the second network node has at least one of a radio link control layer function, a media access control layer function, or a physical layer function.

4. The method according to claim 3, wherein the packet data convergence protocol layer function comprises at least one of a packet data convergence protocol layer control plane function or a packet data convergence protocol layer user plane function.

5. The method according to claim 1, wherein the indication information carried in the first network node further indicates a paging message that exists for paging the UE; and
  the second indication information carried in the DCI further indicates the paging message that exists for paging the UE, wherein the paging message that exists for paging the UE causes the UE to provide identification information of the UE to a network.

6. The method according to claim 1, wherein the second indication information carried in the DCI is a preset value.

\* \* \* \* \*